United States Patent
Nawrocki

(10) Patent No.: US 9,618,617 B2
(45) Date of Patent: Apr. 11, 2017

(54) LEVEL MEASUREMENT USING CORRELATION BETWEEN A PAIR OF SECONDARY REFERENCE SIGNALS

(71) Applicant: Honeywell International Inc., Morristown, NJ (US)

(72) Inventor: Andrzej Wlodzimierz Nawrocki, Port Coquitlam (CA)

(73) Assignee: Honeywell International Inc., Morristown, NJ (US)

(*) Notice: Subject to any disclaimer, the term of this patent is extended or adjusted under 35 U.S.C. 154(b) by 245 days.

(21) Appl. No.: 14/664,464

(22) Filed: Mar. 20, 2015

(65) Prior Publication Data

US 2016/0274234 A1    Sep. 22, 2016

(51) Int. Cl.
| | |
|---|---|
| *G01S 15/88* | (2006.01) |
| *G01S 7/292* | (2006.01) |
| *G01S 7/527* | (2006.01) |
| *G01F 23/284* | (2006.01) |
| *G01S 13/26* | (2006.01) |
| *G01F 23/296* | (2006.01) |
| *G01S 13/88* | (2006.01) |
| *G01S 15/10* | (2006.01) |

(52) U.S. Cl.
CPC ............ *G01S 15/88* (2013.01); *G01F 23/284* (2013.01); *G01F 23/2962* (2013.01); *G01S 7/2926* (2013.01); *G01S 7/527* (2013.01); *G01S 13/26* (2013.01); *G01S 13/88* (2013.01); *G01S 15/101* (2013.01)

(58) Field of Classification Search
CPC .......... G01S 15/88; G01S 7/527; G01S 13/26; G01S 13/88; G01S 7/2926; G01S 15/101; G01F 23/2962; G01F 23/284
See application file for complete search history.

(56) References Cited

U.S. PATENT DOCUMENTS

| | | |
|---|---|---|
| 6,504,793 B2 | 1/2003 | Fuenfgeld |
| 7,823,446 B2 | 11/2010 | Nilsson et al. |
| 7,826,309 B2 | 11/2010 | Spanke et al. |
| 8,844,352 B2 | 9/2014 | Nilsson et al. |
| 2013/0300595 A1 | 11/2013 | Hemmendorff |
| 2016/0274234 A1* | 9/2016 | Nawrocki ............... G01S 15/88 |

FOREIGN PATENT DOCUMENTS

| | | | |
|---|---|---|---|
| WO | 2006122778 A2 | 11/2006 | |
| WO | WO 2016153771 A1 * | 9/2016 | ............ G01S 15/88 |

* cited by examiner

*Primary Examiner* — Daniel Pihulic
(74) *Attorney, Agent, or Firm* — Jetter & Associates, P.A.

(57) ABSTRACT

A method of measuring a level of a material in a tank. A first secondary reference (FSR) signal is generated when a reference pulse is transmitted into the tank and a second secondary reference signal (SSR) signal is generated when an echo signal responsive to the reference pulse is received. A plurality of FSR signals and a plurality of SSR signals are stored. The plurality of FSR signals and plurality of SSR signals are transferred to a correlator block which calculates a plurality of correlation function values (CFVs) that have magnitudes reflecting a degree of matching between pairs of the SSR signals with their associated FSR signals. Using a maximum CFV result a time interval (Tm) is calculated between the FSR signal and SSR signal associated with the maximum CFV result, and the level of material in the tank is determined from Tm.

16 Claims, 5 Drawing Sheets

LEVEL MEASUREMENT USING CORRELATION BETWEEN A PAIR OF SECONDARY REFERENCE SIGNALS

FIELD

Disclosed embodiments relate to radar or ultrasound level measurement.

BACKGROUND

Conventional level measurement implements time domain reflectometry (TDR) by transmitting microwave or ultrasound pulses (reference pulses) from an antenna or waveguide to the surface (or interface) of a material in a container (or tank) and measuring signals reflected (echo signals) including signals from that surface or interface. For example, when a radar reference pulse reaches a material with a different dielectric constant, part of the microwave energy is reflected back which is received by a receiver as an echo pulse. The echo pulse has an associated echo amplitude. Generally, the echo pulse will have the same shape as the reference pulse that is sent down the waveguide, but its sign and magnitude depend on the change in impedance level. Known radar level measurement methods include non-contact radar typically being pulsed radar and contact radar typically being frequency modulated continuous wave (FMCW) radar.

For TDR-based level measurement devices or systems, the reference pulse is superimposed on the echo signal reflected by an object or interface in an at least partially filled tank, whose distance (or level) is to be measured. In known methods, in order to determine the time position of the echo pulse in the echo signal to determine travel time T to enable calculation of a level value, the time profile of the echo signal is compared with a stored reference echo signal that was generated by the level measurement system without any objects or product material in the measurement path or an otherwise empty tank. The echo signal generated for an at least partially filled tank is different from the reference echo signal generated for an empty tank by at least one additional pulse sometimes referred to as an interface pulse that results from the reflection of the reference pulse at the interface(s) in the tank (e.g., an interface between a product liquid and the gas above). The time position determination of the interface pulse requires comparing the reference echo signal with the echo signal, with the simplest case being the reference echo signal subtracted from the echo signal performed incrementally through subtraction of amplitude values that are located at corresponding time positions of the signal profiles of the reference echo signal and the echo signal.

Due to the change in impedance at the reflection surface (e.g., the interface), points on the echo signal curve including the interface pulse generally have an amplitude that deviates from the points on the reference echo signal curve. Making the comparison of the echo signal and the reference echo signal to determine the travel time T can thus become difficult since significant amplitude offsets between the echo signal and the reference echo signal are generally present which can lead to errors in the level measurement.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments eliminate problems described above with measuring the time interval (travel time) between the reference echo signal and the echo pulse used for calculating the material level in tanks by eliminating the conventional need for measuring amplitude offsets between the echo pulse (or interface pulse) and the reference echo signal by using a correlation measure between a pair of new signals referred to herein as secondary reference signals. Unlike a conventional reference echo signal obtained when the tank is empty, disclosed secondary reference signals are used while there is product material in the tank, and the tank can be operating. A first secondary reference (FSR) signal is generated when a reference pulse is transmitted by a transmitter into the tank and a second secondary reference (SSR) signal is generated when an echo signal including an echo pulse is received responsive to the reference pulse.

During each measurement cycle, a correlator block (hardware or software) calculates a plurality of correlation function values (CFVs) which each reflect a match between the SSR signals and their associated FSR signals. "Correlation" as used herein compares each FSR signal generated when the reference pulse is transmitted and its associated SSR signal (which both have the same shape) generated when the echo signal responsive to the reference pulse is received, so that the SSR signals are time-delayed versions of the FSR signals which reflect the travel time by their delay. When the plurality of CFVs is determined to have a maximum CFV result that is above a predetermined minimum level, a time interval between the FSR signal and SSR signal associated with the maximum CFV (corresponding to the travel time shown in FIG. 3 in the examples section below and referred to herein as Tm) is calculated, and the level of the material in the tank can be calculated from Tm.

DETAILED DESCRIPTION

Figure 1A:
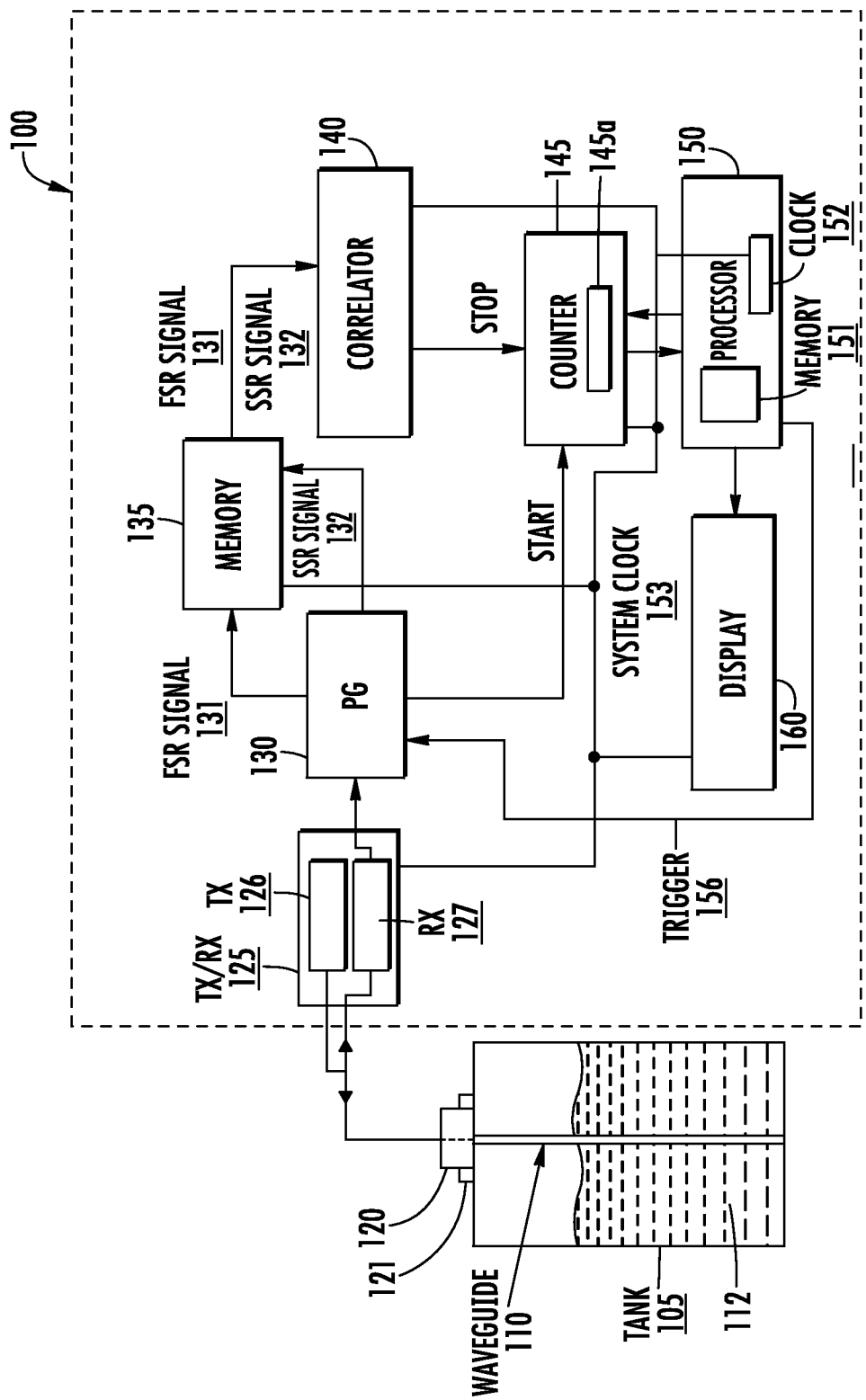
FIG. 1A is a block diagram depiction of an example frequency modulated continuous wave (FMCW) radar system having a disclosed level measurement system including a correlation block for calculating a match between FSR and SSR signals to calculate Tm which reflects a time between a reference pulse and an echo pulse (Tm), according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitic in the pathway, or through an indirect electrical connection via intervening items including other devices and connections. For indirect coupling, the intervening item generally does not modify the information of a signal but may adjust its current level, voltage level, and/or power level.

Disclosed embodiments provide methods and systems for radar and ultrasound-based level measurement which enables accurate level measurements through calculating a match between a plurality of FSR signals and a plurality of associated SSR signals generated each measurement cycle, and selecting the best matching FSR and SSR pair to calculate Tm. The FSR and SSR signal pulse shapes and amplitudes do not depend on properties of an object (or interface) for which distance to the object (or interface) is to be measured. As a result, disclosed embodiments solve conventional level measurement system problems with measuring the travel time between the reference echo signal and the echo pulse by eliminating the conventional need for measuring amplitude offsets between these signals.

FIG. 1A is a block diagram depiction of an example FMCW radar range level measurement system (level measurement system) 100 using correlation for calculating matches between a plurality of FSR and SSR signal pairs, and for selecting the best matching FSR and SSR pair(s) to calculate Tm. System includes a waveguide 110 inside of a tank (or container) 105. A FSR signal 131 is generated by a pulse generator circuit (PG) 130 at essentially the same time when a transmitted reference pulse (reference pulse) is sent by a transmitter (TX) 126 shown provided by a transceiver (TX/RX) 125 also including a receiver 127 through a feed-through 120 sealed to the top of the tank 105 with a flange 121 to the waveguide 110 into the tank 105 having a product material 112 therein.

PG 130 can comprise an electronic circuit or a piece of electronic test equipment. A SSR signal 132 is also generated by PG 130 at essentially the same time when the echo signal including an echo pulse responsive to the reference signal is received by the RX 127. Typically, the level measurement system 100 components including the TX/RX 125 are within a single common enclosure or housing, such as a flame-proof and/or explosion-proof housing.

The generation of FSR signal 131 and SSR signal 132 are thus synchronized with the reference pulse and the echo pulse, respectively, where the SSR signals 132 are time-delayed versions of the FSR signals 131 which reflect Tm by their relative delay. There are a variety of possible methods available to achieve the synchronization of the FSR signals 131 with the reference pulse with and synchronization of the SSR signals 132 with the echo pulse. The synchronization method can select a "marker" used to determine which signal characteristic for both the reference pulse and the echo pulse is used for triggering the generation of FSR signals 131 and SSR signal 132, respectively. Possible markers include an amplitude of the signal, slope of a rising edge of the signal, or a point of zero crossing of the signal, or a combination of all above.

A disclosed algorithm, which is stored in a memory block that is executed by the processor 150 can use a "marker"-based method for generating trigger control signals (shown as "trigger" 156) typically being pulses, which are coupled to the PG 130 for synchronizing the triggering a FSR signal 131 with the transmitting of the reference pulse and triggering of a SSR signal 132 with the receipt of the echo pulse. Level measurement system 100 also has a system clock 153 shown provided by the processor clock 152 to provide clocking for the processor 150 and for controlling other timing therein in the level measurement system 100.

Although the system clock 153 is shown provided by the processor clock 152, there are numerous other ways the system clock 153 can be implemented, such as a separate (dedicated) clock circuit. The system clock 153 is typically a square wave that synchronizes and controls functions of PG 130 (other than FSR signal 131 and SSR signal 132 generation), and synchronizes and controls the first memory 135, correlator block 140, counter 145, and the second memory 145*a*. The PG 130 is shown coupled to the counter 145 for determining when for the counter 145 to start, and the correlator block 140 is shown determining when for the counter 145 to stop. Although described herein as having first memory 135, second memory 145*a*, and memory 151 associated with processor 150, level measurement system 100 may utilize other memory arrangements such as a single memory, or a memory 151 associated with processor 150 and one other memory.

The frequency of the FSR signal 131 depends on frequency of the reference pulse transmitted by the TX 126 via waveguide 110 into the tank 105. The frequency of FSR signal 131 can be the same as the frequency of the reference pulse in a simplest implementation. However, the use of any frequency for the FSR signal 131 that is an integer multiple of the frequency of the reference pulse can also be used.

Figure 3:
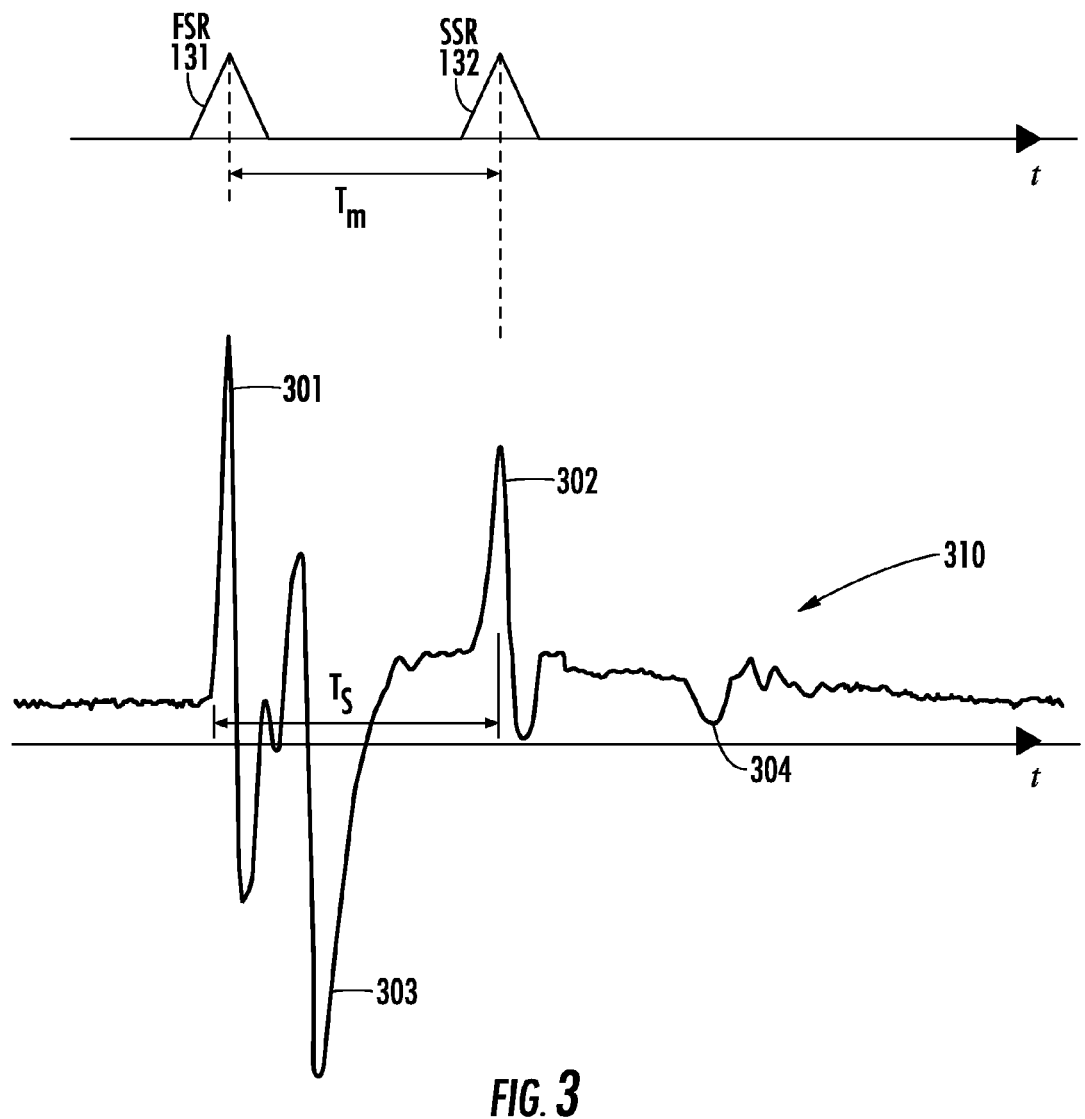
FIG. 3 shows an example profile of a conventional signal including a reference pulse superimposed on an echo pulse captured during operation by a level measurement system described as being a guided wave radar (GWR) system that measures a level of an interface between gas and liquid in a tank, and its timing relationship with disclosed FSR and SSR signals shown as being triangular waveforms above the conventional signal that are used to calculate Tm to enable determining the level of the liquid material in the tank, according to an example embodiment.

The pulse associated with the FSR signal 131 is defined by its shape, its amplitude and its frequency. Regarding the pulse shape for the FSR signal 131, generally any signal shape can be used as long as the FSR signal 131 has a single rising edge, a single peak (amplitude) and a single falling edge. For simplicity, the pulse width of the FSR signal 131 can be the same as the pulse width of the reference pulse. Using a FSR signal 131 with a smaller pulse width compared to the reference pulse width can also be used as long as the shape of FSR signal 131 is symmetrical with respect to its peak or the peak of the signal is placed at equal distances from both edges. Using signals for the FSR signal 131 with larger pulse width as compared to the reference pulse width can cause additional errors in the level measurement and can increase complexity of the system. A simple example shape for the FSR signal 131 is a triangle waveform shape, such as shown in FIG. 3 described below in the Examples section. It is expected to have a single echo signal generated in response to a single reference signal, so that there will generally be the same number of FSR signals 131 and SSR signals 132.

The SSR signal 132 and FSR signal 131 can both be generated by the same PG 130. Separate PGs (two PGs) can also be used provided the respective PGs are synchronized which can add some complexity, which can be minimized by having matched first and second PGs on the same chip/die to ensure that FSR signal 131 and SSR signal 132 are essentially identical which is generally a desired arrangement as it simplifies the design and implementation. However, typically a most important system feature is to generally ensure that the pulses from both FSR signal 131 and SSR signal 132 have the same frequency (or an integer multiple thereof). A measurement system where the FSR signal 131 and SSR signal 132 have different amplitudes can generally be used as long as symmetry of the amplitude conditions described above are met. The same applies for the pulse shape, with the triangular shape being one example that is generally a simplest implementation option.

For the FSR and SSR signals, PG 130 allows control of the pulse repetition rate (frequency), pulse width, delay with respect to an internal or external trigger and the high- and low-voltage levels of the pulses. PG 130 also controls the rise time and fall time for the FSR and SSR signals.

The FSR signals 131 and SSR signals 132 generated by PG 130 are both shown stored in memory 135. The correlation function implemented by correlator block 140 by its nature performs calculations on a series of samples that represent the FSR and SSR signals over an interval of time (measurement cycle). Memory 135 can comprise a static random access memory (SRAM) a dynamic random access memory (DRAM), or a flash memory, which provides the FSR signals 131 and SSR signals to the correlator block 140 at each system clock 153 signal. The memory storing the FSR signals 131 and SSR signals 132 can be located in other locations other than memory 135 as shown, such as on the same chip as the processor 150 shown as memory 151 (e.g., SRAM/DRAM/flash memory).

The correlator block 140 calculates in real-time values of a correlation function (correlation function values "CFVs") determined by comparing the degree of correlation (match) between each SSR signal 132 and its associated FSR signal 131. CFV values being stored enables detecting a maximum value from a wide range (large number) of calculated CFV values acquired during each measurement cycle. The calculating of CFVs can be repeated several times for each pair of FSR and SSR signals, which will produce a range of several maximum CFVs that can be averaged out to obtain a maximum CFV result that is essentially free of noise errors which represents the time Tm used for calculating the level L. The actual shape, pulse width or signal amplitudes for the FSR signal 131 and the SSR signal 132 is generally not important as long as certain requirements for both of these signals are met as described above. The correlator block 140 can be implemented as hardware solution such as a Field-Programmable Gate Array (FPGA) or application-specific integrated circuit (ASIC), a software algorithm run by a processor 150, or a combination of both hardware and software.

The CFV values reflect quantitatively how well each SSR signal 132 when overlayed on its associated FSR signal 131 matches (correlates). A maximum CFV result is indicated when a given SSR signal 132 is essentially an exact copy (i.e., shape) of its associated FSR signal 131 where the higher the CFV, the better the FSR/SSR signal match is. Known algorithms for determining CFVs may be used, such as based on calculating maximum autocorrelation values. Disclosed embodiments thus recognize in any practical level measurement system implementation it will be almost impossible to ensure that FSR and SSR signals are identical due to a variety of generally random errors (noise), which is overcome by calculating a maximum AFV result from a large number of FSR and SSR signal pairs to determine Tm.

The level measurement system 100 generally includes one or more algorithms stored in memory 151 run by the processor 150 for performing calculations including real-time calculations of the correlation function to generate the CFVs. A result of these calculated CFVs is an array (a plurality of) of CFVs that is stored in a memory, such as shown as memory 145a associated with counter 145. These CFVs will range from a minimum value (where the minimum value can be zero or close to zero depending on how much noise is present in the level measurement system 100) to a maximum (highest) value.

The actual value of the maximum CFV result will generally depend on a plurality of different factors, e.g. an amplitude, or the scaling of the FSR signals 131 and SSR signals 132. For any particular level measurement system a practical maximum CFV reference value can be measured during a calibration process, where an empty tank can be used for the calibration process. For the purpose of this Application a maximum CFV result is defined as the highest value from a plurality of calculated CFVs, acquired during a measurement cycle, such as stored in memory 145a. Based on properties of the correlation function and requirements for the FSR signal 131 and SSR signal 132 there should be only one highest maximum CFV in the range (for a particular defined period of time representing one measurement cycle).

When the SSR signal 132 and FSR signal 131 are determined to sufficiently match one another (i.e., results in a maximum CFV) a CFV result is generated and the output of the correlator block 140 can then change its logical output value, from logic LOW to logic HIGH or logic HIGH to logic LOW, which when a logic state change is received by the processor 150 (via the counter 145 as shown) can cause the processor 150 to read the maximum CFV result (stored in memory 145a) and its associated FSR signal and SSR signal. The counter 145 can be implemented as an algorithm (e.g., by processor 150) or as hardware.

Using the Tm associated with the maximum CFV result, the processor 150 calculates the distance (D) to the object (e.g., interface) in the tank 105 and can display this distance (or level, L) value on display device 160 shown in FIG. 1A, generally in real-time. At the end of this measurement cycle the processor 150 can reset the counter 145, and erase the CFV contents of memory 145a, and FSR signals 131 and SSR signals 132 in memory 135, and start a new level measurement cycle.

Figure 1B:
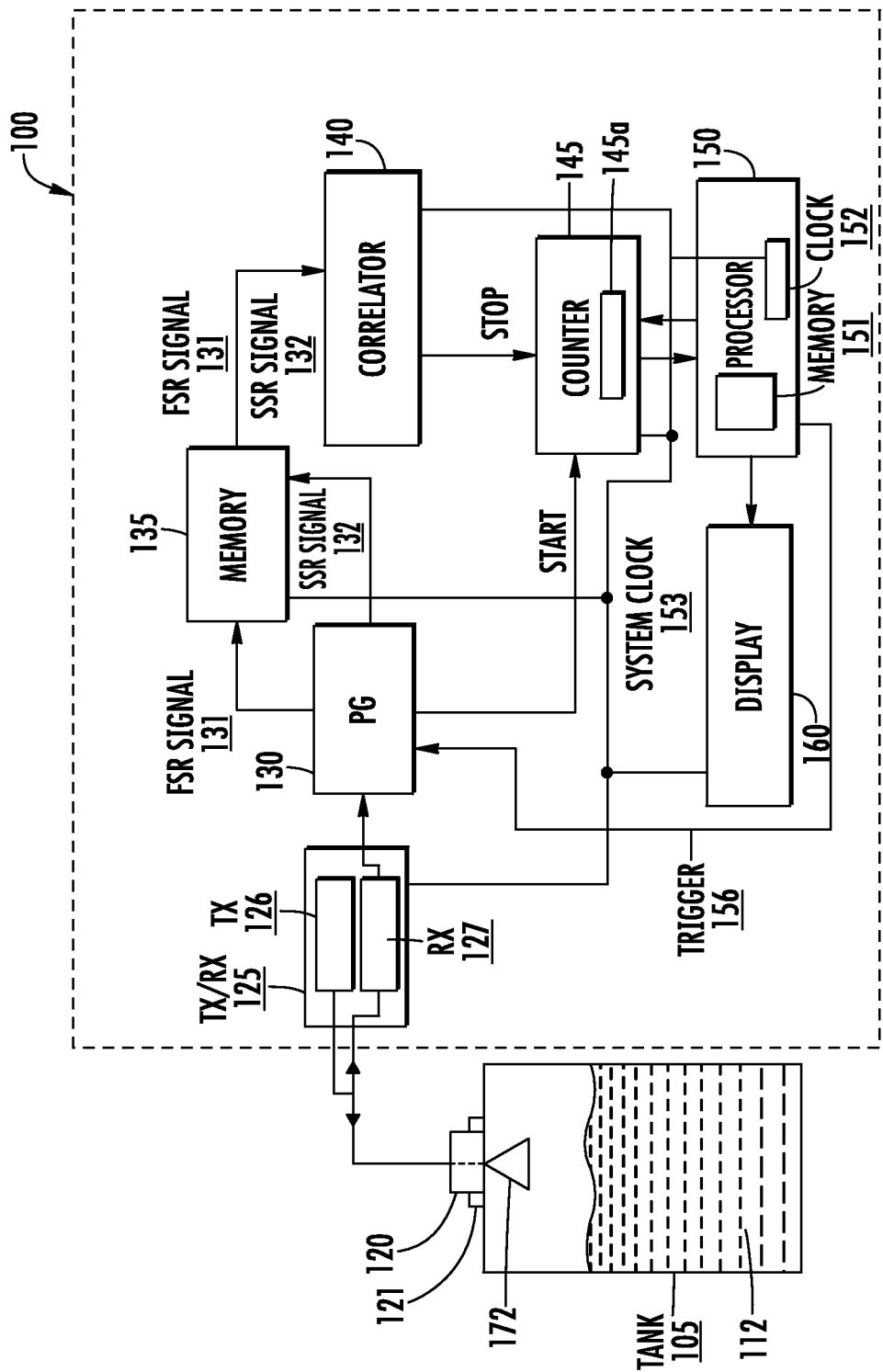
FIG. 1B is a block diagram depiction of an example non-contact radar system having a level measurement system including a correlation block for calculating a match between FSR and SSR signals to calculate Tm, according to an example embodiment.

FIG. 1B is a block diagram depiction of an example non-contact radar system having level measurement system 100 including a correlator block 140 for calculating a match between FSR and SSR signals to calculate Tm, according to an example embodiment. In this embodiment, a horn antenna 172 is located near the top of the tank 105. Level finding algorithms generally stored in memory 151 will generally be customized for the non-contact radar system. As known in the art ultrasonic level sensors are another non-contacting level measurement method that works by the "time of flight" principle using the speed of sound. The ultrasound sensor emits a high-frequency pulse, generally in the 20 kHz to 200 kHz frequency range, and then waits for an echo. The pulse is transmitted in a cone, usually about 6° at the apex. The pulse is incident at the level surface and is reflected back to the ultrasound sensor now acting as a receiver.

Figure 1C:
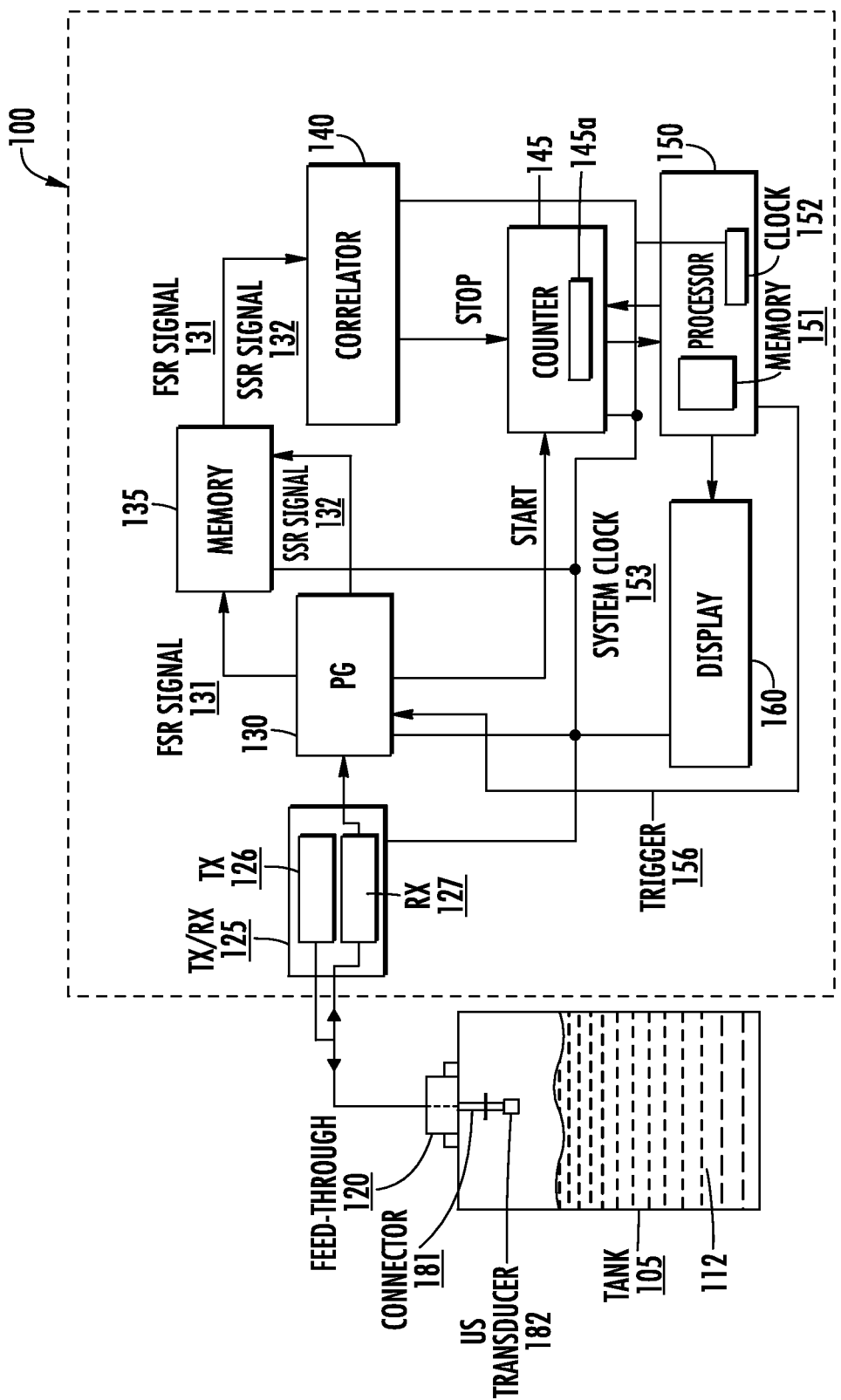
FIG. 1C is a block diagram depiction of an example ultrasound level measurement system having a correlation block for calculating a match between FSR and SSR signals to calculate Tm, according to an example embodiment.

FIG. 1C is a block diagram depiction of an example ultrasound level measurement system having level measurement 100 system including a correlator block 140 for calculating a match between FSR and SSR signals to calculate Tm, according to an example embodiment. The ultrasound level measurement system includes a connector 181 having an ultrasound transducer 182 connected thereto. Level finding algorithms generally stored in memory 151 will generally be customized for the ultrasound system.

Figure 2:
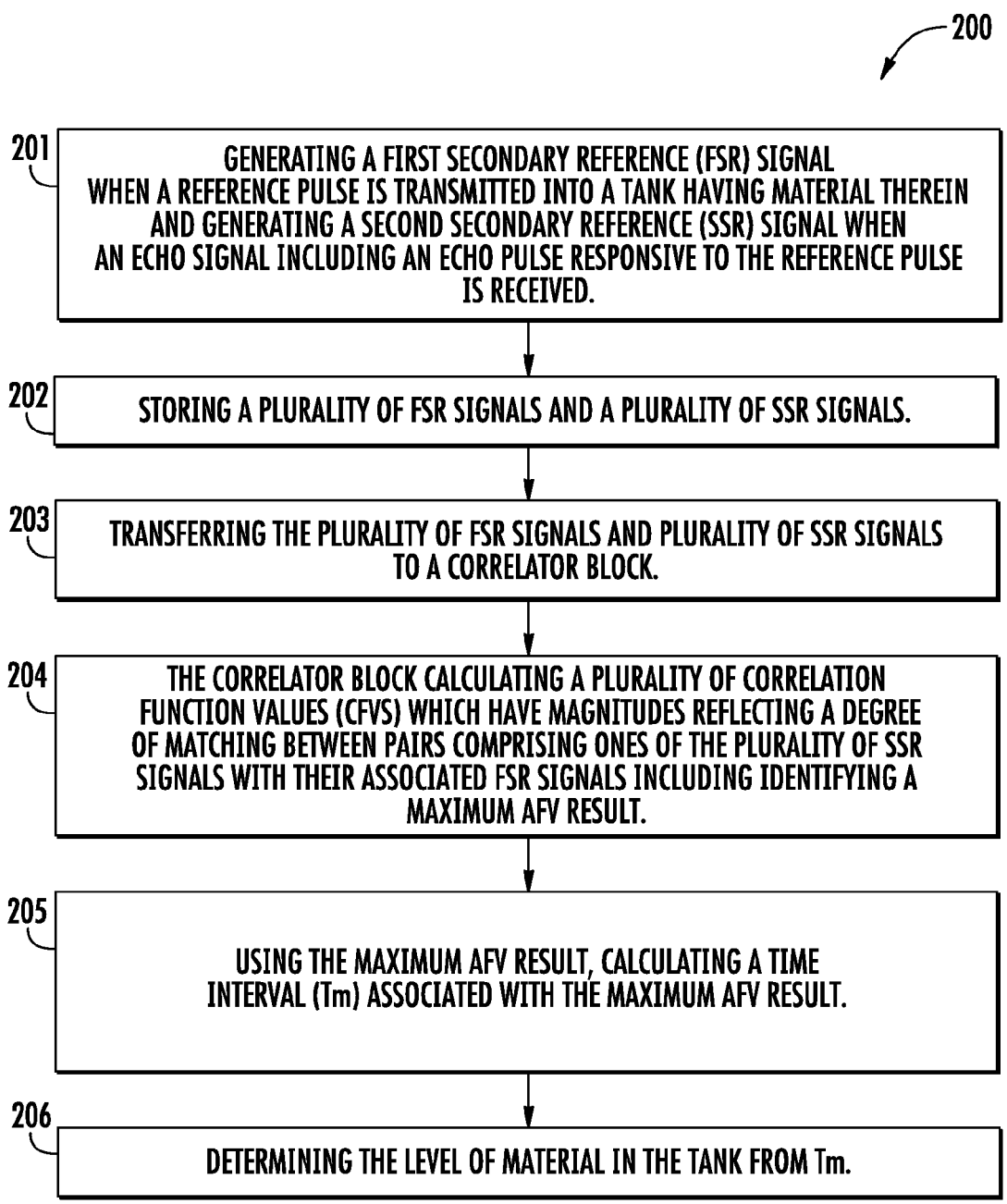
FIG. 2 is a flow chart that shows steps in an example method of measuring a level of a material in a tank by calculating a match between FSR and SSR signals to calculate Tm, according to an example embodiment.

FIG. 2 is a flow chart for an example method 200 of measuring a level of a material in a tank by calculating a match between FSR and SSR signals to calculate Tm, according to an example embodiment. Step 201 comprises generating a FSR signal when a reference pulse is transmitted into the tank and generating a SSR signal when an echo signal including an echo pulse responsive to the reference pulse is received. Step 202 comprises storing a plurality of FSR signals and a plurality of SSR signals. Step 203 comprises transferring the plurality of FSR signals and plurality of SSR signals to a correlator block. Step 204 comprises the correlator block calculating a plurality of CFVs which have magnitudes reflecting a degree of matching between pairs comprising ones of the plurality of SSR signals with their associated FSR signals including identifying a maximum CFV result. Step 205 comprises using the maximum CFV result calculating Tm associated with the maximum CFV result. Step 206 comprises determining the level of material in the tank from Tm.

Disclosed level measurement systems can be used for non-contact radar such as pulsed radar and frequency modulated continuous wave (FMCW) radar. Moreover, as noted above disclosed level measurement systems can be applied to ultrasound systems.

Examples

Disclosed embodiments are further illustrated by the following specific Examples, which should not be construed as limiting the scope or content of this Disclosure in any way.

FIG. 3 shows an example profile of a conventional echo signal 310 including a transmitted reference pulse (reference pulse) 301 and an echo pulse 302 resulting from an interface in the tank that is captured during operation by a disclosed level measurement system, described as being a GWR system for measuring a location of the interface (e.g., between gas and liquid in a tank), and its timing relationship with disclosed FSR and SSR signals shown as being triangular waveforms above the conventional echo signal 310. It is noted that FIG. 3 represents only an example not a real profile of an echo signal. In a real situation the actual profile may be significantly different. The main purpose of FIG. 3 is to show time dependence between the disclosed secondary reference signals (FSR and SSR) and the relationship of the disclosed secondary reference signals FSR and SSR to the reference pulse 301 and echo pulse 302 of the echo signal. As noted above, for determining the time position (shown as Ts in FIG. 3) of the echo pulse 302 in the signal profile of the echo signal 310 conventional level measurement systems must obtain a "reference echo signal" (not shown) generated by the level measurement system without any objects or product material in the measurement path or an otherwise empty tank for comparing with the echo signal 310.

The reference pulse 301 marks the time of reference signal transmission, and the echo pulse 302 represents the reflection of the reference pulse 301 in the waveguide at the interface at which there is change in impedance in the waveguide. The negative pulse 303 represents a negative going signal that results from the reflection of the reference pulse 301 at the transition between the feed-through (marked as 120 in FIGS. 1A, 1B and 1C) and the flange (marked as 121 in FIGS. 1A, 1B and 1C).

The presence of negative pulse 303 assumes the feed-through and flange have different impedances. The pulse 304 represents a signal that results from the reflection of the transmit pulse at the end of the waveguide (the bottom of the tank marked as 105 in FIGS. 1A, 1B and 1C). The time shown as Ts represents the travel time for the reference pulse 301 to travel up to the point where this pulse gets reflected from the interface. For simplicity, Ts is shown being measured between the reference pulse 301 and the echo pulse 302.

Now turning to disclosed FSR signal 131 and SSR signal 132 waveforms above the conventional signal, the time interval Tm represents the time difference between peaks of the FSR signal 131 and SSR signal 132 that as described above are both generated by the same pulse generator (PG 130 in FIGS. 1A, 1B and 1C). For simplicity it is shown that these two pulses (FSR signal 131 and SSR signal 132) reach their respective maximum values (amplitude) when the reference pulse 301 and the echo pulse 302 reach their peaks. However, other methods of synchronization can be used as long as the level measurement system can maintain correlation between these two sets of signals (FSR signal 131, SSR signal 132, and reference pulse 301, echo pulse 302) so that the condition Ts=Tm remains true.

Tm is determined by calculating the correlation between the FSR signal 131 and SSR signal 132 pairs to generate CFV values, and Tm is calculated when there is a maximum CFV result calculated that is a sufficiently high value (e.g., compared to a predetermined minimum CFV value from a calibration process). The maximum CFV result is essentially free of noise errors which represents Tm. The level of the liquid (or other material) in the tank can be determined from Tm using time domain reflectometry (TDR) as Tm is essentially=conventional Ts.

Since Tm is derived directly from the properties of the correlation function that samples an array of CFV values to identify a maximum CFV result during each measurement cycle that provides averaging and eliminates the need for measuring amplitude offsets, Tm provides a more accurate time measure for the time difference between the echo pulse 302 and the reference pulse 301 as compared to conventional $T_S$ determination. As described above conventional $T_S$ determination requires comparing the reference echo signal with the echo signal 310 performed incrementally through subtraction of amplitude values that are located at corresponding time positions of the signal profiles of the reference echo signal and the echo signal 310 which involves measuring amplitude offsets which is subject to amplitude offset-based time measurement errors.

For the purpose of explaining the principle of level measurement disclosed herein, negative pulse 303 and pulse 304 can be omitted from the analysis. However, as known in the art, these pulses can be used for level system calibration or diagnostics using correlation as well.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of measuring a level of a material in a tank, comprising:
   generating a first secondary reference (FSR) signal when a reference pulse is transmitted into said tank and generating a second secondary reference (SSR) signal when an echo signal including an echo pulse responsive to said reference pulse is received;
   storing a plurality of said FSR signals and a plurality of said SSR signals;
   transferring said plurality of said FSR signals and said plurality of said SSR signals at a correlator block;
   said correlator block calculating a plurality of correlation function values (CFVs) which have magnitudes reflecting a degree of matching between pairs comprising ones of said plurality of said SSR signals with their associated one of said plurality of said FSR signals including a maximum CFV result;
   using said maximum CFV result calculating a time interval (Tm), and
   determining said level of said material in said tank from said Tm.

2. The method of claim 1, further comprising identifying said maximum CFV result comprising comparing said plurality of said CFVs to a predetermined minimum CFV value determined during a calibration process, wherein said tank is empty during said calibration process.

3. The method of claim 1, wherein a common pulse generator (PG) circuit is used for both said generating said FSR signals and said generating said SSR signals.

4. The method of claim 1, further comprising storing said plurality of said CFVs, and after said calculating, erasing said plurality of said CFVs, said plurality of said FSR signals and said plurality of said SSR signals, and then starting a new level measurement cycle again using said method.

5. The method of claim 1, wherein said method comprises frequency modulated continuous wave (FMCW) radar.

6. The method of claim 1, wherein said method comprises non-contact radar.

7. The method of claim 1, wherein said method comprises ultrasound.

8. The method of claim 1, wherein said plurality of said FSR signals and said plurality of said SSR signals have a same frequency or a frequency that is an integer multiple thereof.

9. A level measurement system for measuring a level of a material in a tank, comprising:
   a transmitter providing a pulse output and a receiver having a pulse input each coupled to a probe, waveguide, antenna or ultrasonic transducer in said tank;
   a pulse generator circuit (PG) having an input coupled to an output of said receiver, said PG for generating a first secondary reference (FSR) signal when a transmitted reference pulse (reference pulse) is sent by said transmitter into said tank and for generating a second secondary reference (SSR) signal when an echo signal including an echo pulse responsive to said reference pulse is received by said receiver;
   a first memory for storing a plurality of said FSR signals and a plurality of said SSR signals obtained of over an interval of time;
   a correlator block coupled to said first memory for receiving said plurality of said FSR signals and said plurality of said SSR signals, wherein said correlator block is for calculating a plurality of correlation function values (CFVs) which have magnitudes reflecting a degree of matching between pairs comprising ones of said plurality of said SSR signals with their associated one of said plurality of said FSR signals,
   a second memory for storing said plurality of said CFVs;
   said correlator block coupled to said second memory for identifying a maximum CFV result from said plurality of said CFVs, and
   a processor coupled to said PG for providing trigger signals to said PG and coupled to said correlator block, wherein said processor is for calculating a time interval (Tm) from said maximum CFV result and for determining said level of said material in said tank from said Tm.

10. The system of claim 9, further comprising a counter coupled between said correlator block and said processor.

11. The system of claim 9, wherein said processor identifies said maximum CFV result by comparing said plurality of said CFVs to a stored predetermined minimum CFV value.

12. The system of claim 9, wherein said PG is a single PG used for both said generating said FSR signals and said generating said SSR signals.

13. The system of claim 9, wherein said plurality of said FSR signals and said plurality of said SSR signals have a same frequency or a frequency that is an integer multiple thereof.

14. The system of claim 9, wherein said system comprises a frequency modulated continuous wave (FMCW) radar system that includes said waveguide.

15. The system of claim 10, wherein said system comprises a non-contact radar system that includes said antenna.

16. The system of claim 10, wherein said system comprises an ultrasound system that includes said ultrasonic transducer.

* * * * *